(12) United States Patent
Baehrle-Miller et al.

(10) Patent No.: US 10,780,869 B2
(45) Date of Patent: Sep. 22, 2020

(54) METHOD FOR PROVIDING A BRAKE FORCE IN A VEHICLE

(71) Applicant: Robert Bosch GmbH, Stuttgart (DE)

(72) Inventors: Frank Baehrle-Miller, Schoenaich (DE); Dieter Blattert, Kirchheim/Neckar (DE); Helmut Wolff, Untergrupppenbach (DE); Edith Mannherz, Weinsberg (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 16/081,827

(22) PCT Filed: Feb. 9, 2017

(86) PCT No.: PCT/EP2017/052877
§ 371 (c)(1),
(2) Date: Aug. 31, 2018

(87) PCT Pub. No.: WO2017/167482
PCT Pub. Date: Oct. 5, 2017

(65) Prior Publication Data
US 2019/0023247 A1    Jan. 24, 2019

(51) Int. Cl.
*B60T 13/58* (2006.01)
*B60T 13/74* (2006.01)

(52) U.S. Cl.
CPC .......... *B60T 13/588* (2013.01); *B60T 13/741* (2013.01); *B60T 13/746* (2013.01)

(58) Field of Classification Search
CPC . B60T 8/368; B60T 8/00; B60T 8/365; B60T 8/4072; B60T 13/20; B60T 13/686; B60T 8/885; B60T 8/94; B60T 13/74; B60T 13/741
See application file for complete search history.

(56) References Cited

U.S. PATENT DOCUMENTS

| | | | |
|---|---|---|---|
| 2013/0333988 A1* | 12/2013 | Bieltz | B60T 7/042 188/152 |
| 2013/0338896 A1* | 12/2013 | Baehrle-Miller | B60T 7/042 701/70 |
| 2015/0041257 A1* | 2/2015 | Baehrle-Miller | B60T 8/171 188/1.11 E |
| 2015/0217738 A1* | 8/2015 | Blattert | B60T 13/662 701/70 |
| 2016/0325724 A1* | 11/2016 | Lee | B60T 13/662 |

FOREIGN PATENT DOCUMENTS

| | | |
|---|---|---|
| DE | 10 2008 012 338 A1 | 9/2009 |
| DE | 10 2011 078 900 A1 | 1/2013 |
| DE | 10 2015 217 118 B3 | 8/2016 |

OTHER PUBLICATIONS

International Search Report corresponding to PCT Application No. PCT/EP2017/052877, dated Jun. 8, 2017 (German and English language document) (5 pages).

\* cited by examiner

*Primary Examiner* — Melanie Torres Williams
(74) *Attorney, Agent, or Firm* — Maginot, Moore & Beck LLP

(57) ABSTRACT

A method for providing a brake force in a vehicle includes actuating an electric brake motor, which overrides an idling function, generating a hydraulic braking power, and re-actuating the electric brake motor.

11 Claims, 3 Drawing Sheets

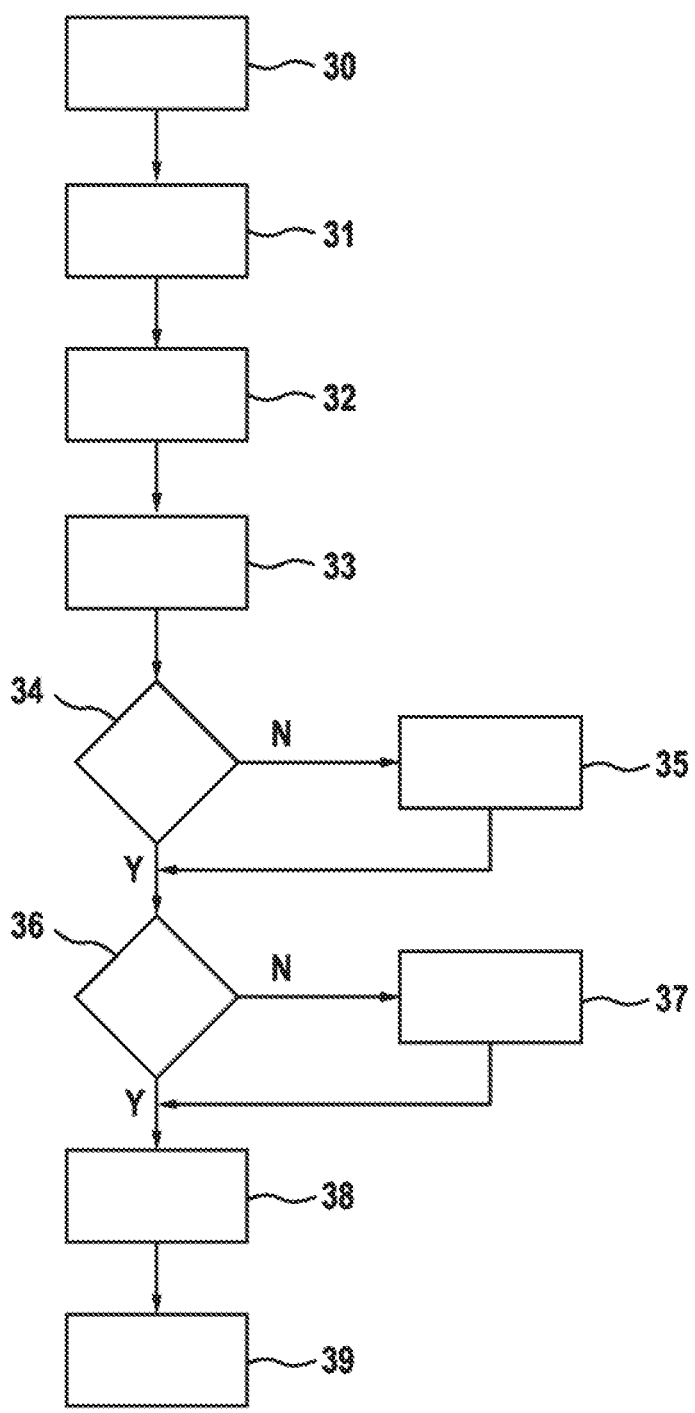

METHOD FOR PROVIDING A BRAKE FORCE IN A VEHICLE

This application is a 35 U.S.C. § 371 National Stage Application of PCT/EP2017/052877, filed on Feb. 9, 2017, which claims the benefit of priority to Serial No. DE 10 2016 205 298.5, filed on Mar. 31, 2016 in Germany, the disclosures of which are incorporated herein by reference in their entirety.

BACKGROUND

DE 10 2011 078 900 A1 describes an electromechanical parking brake via which a vehicle is prevented from rolling away when stationary. The parking brake comprises an electric brake motor via which a clamping force for securing the vehicle can be produced. In this instance, the rotational movement of the electric brake motor is converted into an axial positioning movement of a spindle nut, via which a brake piston which is the carrier of a brake lining is pressed axially against a brake disk.

The electric brake motor is integrated in a wheel brake device which is part of the hydraulic vehicle brake of the vehicle. The hydraulic fluid of the vehicle brake also acts on the brake piston.

SUMMARY

Using the method according to the disclosure, there is provided a brake force in a vehicle which has a hydraulic vehicle brake and an electromechanical brake device having an electric brake motor. The brake motor of the electromechanical brake device acts on a brake piston which carries a brake lining, wherein, in the event of a displacement movement of the brake piston, the brake lining is pressed against a brake disk. The rotational movement of the rotor of the electric brake motor is in this instance advantageously converted into an axial positioning movement of a spindle nut which presses against the brake piston.

The hydraulic vehicle brake comprises one or more wheel brake devices on one or more wheels of the vehicle in which brake fluid which is under hydraulic pressure acts on the same brake piston which is also displaced by the electric brake motor of the electromechanical brake device. The brake piston may be displaced alternatively or in combination both by the electric brake motor and by the brake fluid.

In the method, in order to provide a brake force the electric brake motor is initially actuated until the idle travel of the electric brake motor is passed without a build-up of electromechanical brake force and the spindle nut which is displaced by the rotor shaft of the electric brake motor is in contact with the brake piston, but without producing a brake force.

Subsequently, in the next step, a hydraulic brake force is produced so that in the wheel brake device brake force is produced independently in a hydraulic manner. During this period, the electric motor remains in the contact position thereof which has previously been reached, without producing an electromechanical brake force.

In another step, the electric brake motor is finally actuated again and there is initially passed a play which is brought about by the displacement of the brake piston as a result of the hydraulic brake pressure and which constitutes an additional idle travel. The electric brake motor is subsequently operated further beyond this point so that the brake motor displaces the brake piston and a build-up of electromechanical brake force by the brake motor is achieved.

This procedure has the advantage that, after the braking operation which has been carried out independently has been terminated, the displaced piston position of the electric brake motor is locked by the self-locking action of the brake motor. Consequently, after the braking operation has ended, it is ensured that the brake piston remains in its current piston position which it assumes as a result of the action of both the hydraulic brake pressure and the electric brake motor so that brake force is produced accordingly in a hydraulic and electromechanical manner. The displacement of the brake piston by the hydraulic brake pressure and occurrences of resilience in the wheel brake device which could lead to a reduction of the brake force can be compensated for.

According to an advantageous embodiment, the displacement of the brake piston brought about by the hydraulic brake pressure is determined and, from the displacement of the brake piston, conclusions are drawn relating to the actual hydraulic brake pressure in the wheel brake device. The determination of the displacement of the brake piston by the hydraulic brake pressure is advantageously carried out following the production of the hydraulic brake pressure and the renewed actuation of the electric brake motor which initially passes the additional idle travel which is produced as a result of the hydraulic brake pressure. This additional idle travel corresponds to the displacement of the brake piston as a result of the action with hydraulic brake pressure.

The idle travel in the first step and the additional idle travel in the third step may be determined by means of motorized state variables, in particular with reference to the current path of the electric brake motor, since the current path during the idle travel of the brake motor is at least approximately constant. Accordingly, the contact location between the spindle nut which is displaced by the rotor shaft of the electric brake motor and the brake piston can be determined with adequate precision from the increase of the current path.

The displacement of the brake piston correlates to the applied hydraulic brake pressure so that, with a known displacement of the brake piston—determined from the additional idle travel of the electric brake motor—conclusions can be drawn relating to the actually applied hydraulic brake pressure. This hydraulic brake pressure has to comply with a desired brake pressure. If this is not the case, there can be output a warning signal which can be displayed to the driver and/or be used for further processing, for example, in an electronic control circuit in the vehicle. If, for example, an excessively small displacement of the brake piston is identified, this may indicate an inadequate actual hydraulic brake pressure, which leads to the warning signal being output.

With the build-up of the electromechanical brake force by the brake motor, the brake piston is displaced, whereby the volume which is taken up by the hydraulic brake fluid increases. This leads to a decrease of the hydraulic brake pressure which, according to a preferred embodiment, is compensated for by actuating a hydraulic actuator. The compensation is preferably carried out prior to the time at which the electric brake motor is switched off in order to end the method for providing brake force.

After the electric brake motor following the hydraulic brake pressure has built up brake force in an electromechanical manner, the brake motor is switched off and the locking is carried out as a result of the self-locking action of the brake motor, whereby the hydraulic brake force portion is also maintained and, as a result of the superimposition of both the hydraulic and the electromechanical brake force portion, is permanently effective.

According to yet another advantageous embodiment, the displacement of the brake piston brought about by the hydraulic brake pressure is determined at two different wheel brake devices in the vehicle, preferably on the same axle of the vehicle, and, in the event of a deviation, a warning signal is produced. If the wheel brake devices belong to different brake circuits, where applicable in the different brake circuits a hydraulic pressure difference can be established and a corresponding warning signal can be produced. However, even if they belong to the same brake circuit, a warning signal can be produced in the event of deviation.

Furthermore, it is possible to determine the idle travel of the electric brake motor on two different wheel brake devices, wherein a warning signal is produced in the event of a deviation. The idle travel is either determined in the first step in which the electric brake motor initially passes only the idle travel without subsequent electromechanical brake force build-up, and/or in the subsequent step, after hydraulic brake pressure has been produced and, subsequently, the additional idle travel is travelled by the electric brake motor.

The hydraulic pressure drop, brought about by the build-up of electromechanical brake force, can be compensated for either by actuating a hydraulic actuator, for example, in the context of a compensation control, in particular during the build-up of electromechanical brake force. According to another advantageous embodiment, as a result of an additional portion in the hydraulic brake pressure, a compensation is carried out, wherein the additional portion is advantageously taken into account as a precontrol from the outset. Since the hydraulic pressure drop is normally at least substantially known, this can be taken into account from the outset by a corresponding increase in the hydraulic brake pressure.

As a hydraulic actuator, it is possible to consider, for example, a hydraulic pump of an electronic stability program (ESP) or a brake booster in the brake circuit, for example, an iBooster or eBooster.

The method may be carried out in order to produce a parking brake force when the vehicle is stopped. However, it is also possible to generate a brake force in a moving vehicle using the method, wherein the method is preferably carried out below a speed limit value. The speed limit value is, for example, 30 km/h or a lower value. Using the independent brake force build-up in a hydraulic and electromechanical manner, it is possible, for example, to carry out an automated parking operation. Furthermore, it is also possible to generate a brake force in an automated manner independently of a parking manoeuvre when the vehicle is moving.

Using the parking brake, it is possible, for example, to carry out a highly automated parking operation, in particular without driver intervention, with a higher level of safety, in which the driver where applicable is located outside the vehicle. During the parking operation, the vehicle is braked in conventional manner using the hydraulic vehicle brake. In the event of a failure of the hydraulic vehicle brake, the vehicle can be braked by the electric brake motor of the parking brake.

After the automatic parking operation has ended, the hydraulic brake pressure may if necessary be raised to the target pressure. As long as the contact location between the spindle nut and brake piston has already been approached by controlling the brake motor, via renewed actuation of the parking brake it can be determined over the additional idle travel whether the required hydraulic pressure has been reached.

The different method steps are carried out independently and are carried out in particular in a regulation or control device. This control device may be a component of the vehicle brake system or communicate with the regulation or control device of the vehicle brake system.

BRIEF DESCRIPTION OF THE DRAWINGS

Other advantages and advantageous embodiments can be taken from the additional claims, the description of the Figures and the drawings, in which:

FIG. 3 is a flow chart with method steps for providing a brake force in a vehicle.

DETAILED DESCRIPTION

Figure 1:
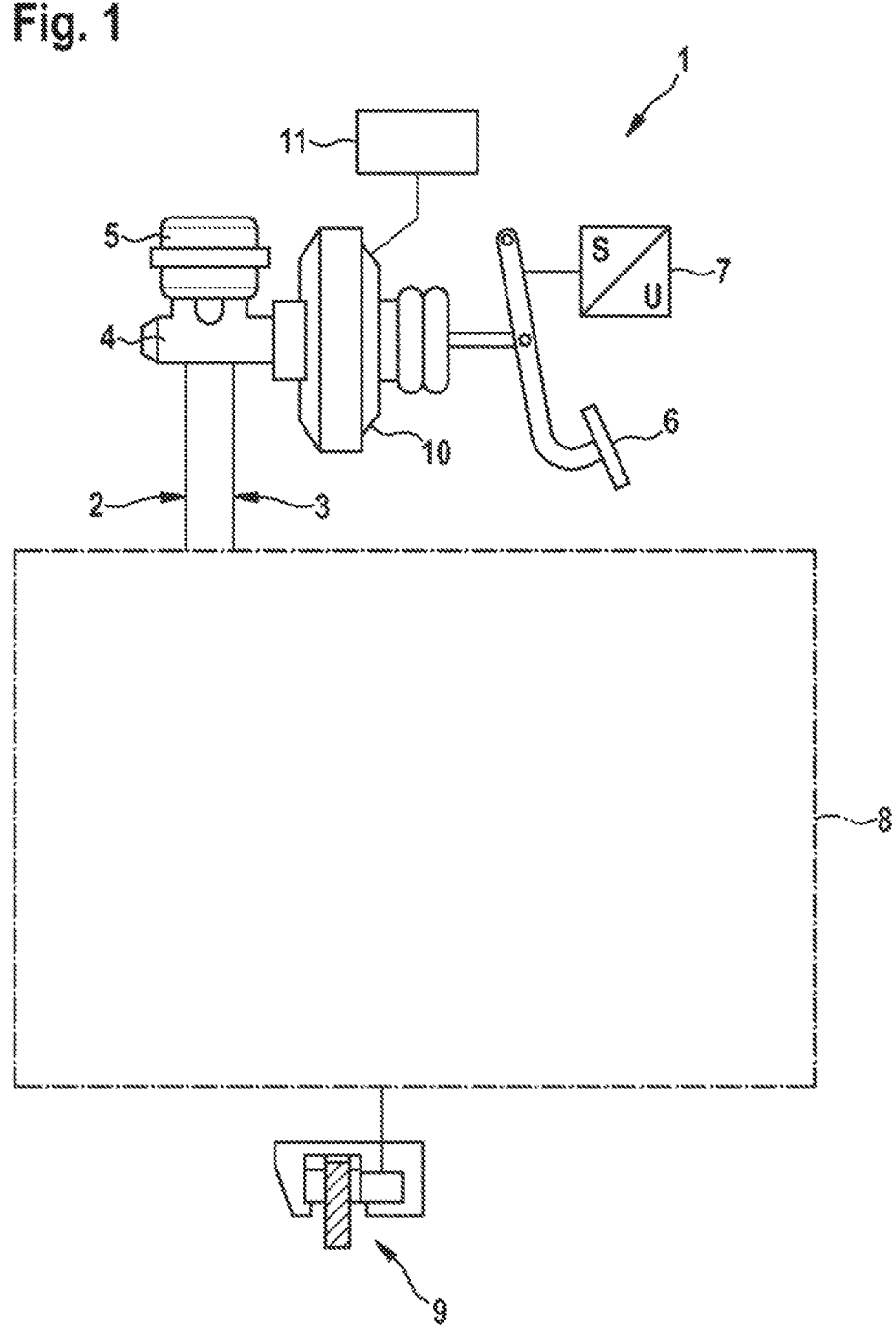
FIG. 1 is a schematic illustration of a hydraulic vehicle brake with a brake booster, wherein the wheel brake devices of the vehicle brake are constructed on the vehicle rear axle additionally as an electromechanical brake device with an electric brake motor.

In the Figures, components which are identical are given the same reference numerals.

The hydraulic vehicle brake 1 illustrated in FIG. 1 for a vehicle comprises a front axle brake circuit 2 and a rear axle brake circuit 3 for supplying electrical power to and controlling wheel brake devices 9 on each wheel of the vehicle with a brake fluid which is under hydraulic pressure. The two brake circuits 2, 3 are connected to a common main brake cylinder 4 which is supplied with brake fluid by means of a brake fluid storage container 5. The main brake cylinder piston within the main brake cylinder 4 is actuated by the driver via the brake pedal 6, the pedal travel applied by the driver is measured by means of a pedal travel sensor 7. Between the brake pedal 6 and the main brake cylinder 4 there is located a brake booster 10 which, for example, comprises an electric motor which preferably by means of a gear mechanism actuates the main brake cylinder 4 (iBooster).

The actuation movement of the brake pedal 6 measured by the pedal travel sensor 7 is transmitted as a sensor signal to a regulation or control device 11 in which actuation signals for controlling the brake booster 10 are produced. The supply of brake fluid to the wheel brake devices 9 is carried out in each brake circuit 2, 3 via different switching valves, which together with additional units are part of a brake hydraulic system 8. The brake hydraulic system 8 further includes a hydraulic pump, which is a component of an electronic stability program (ESP).

Figure 2:
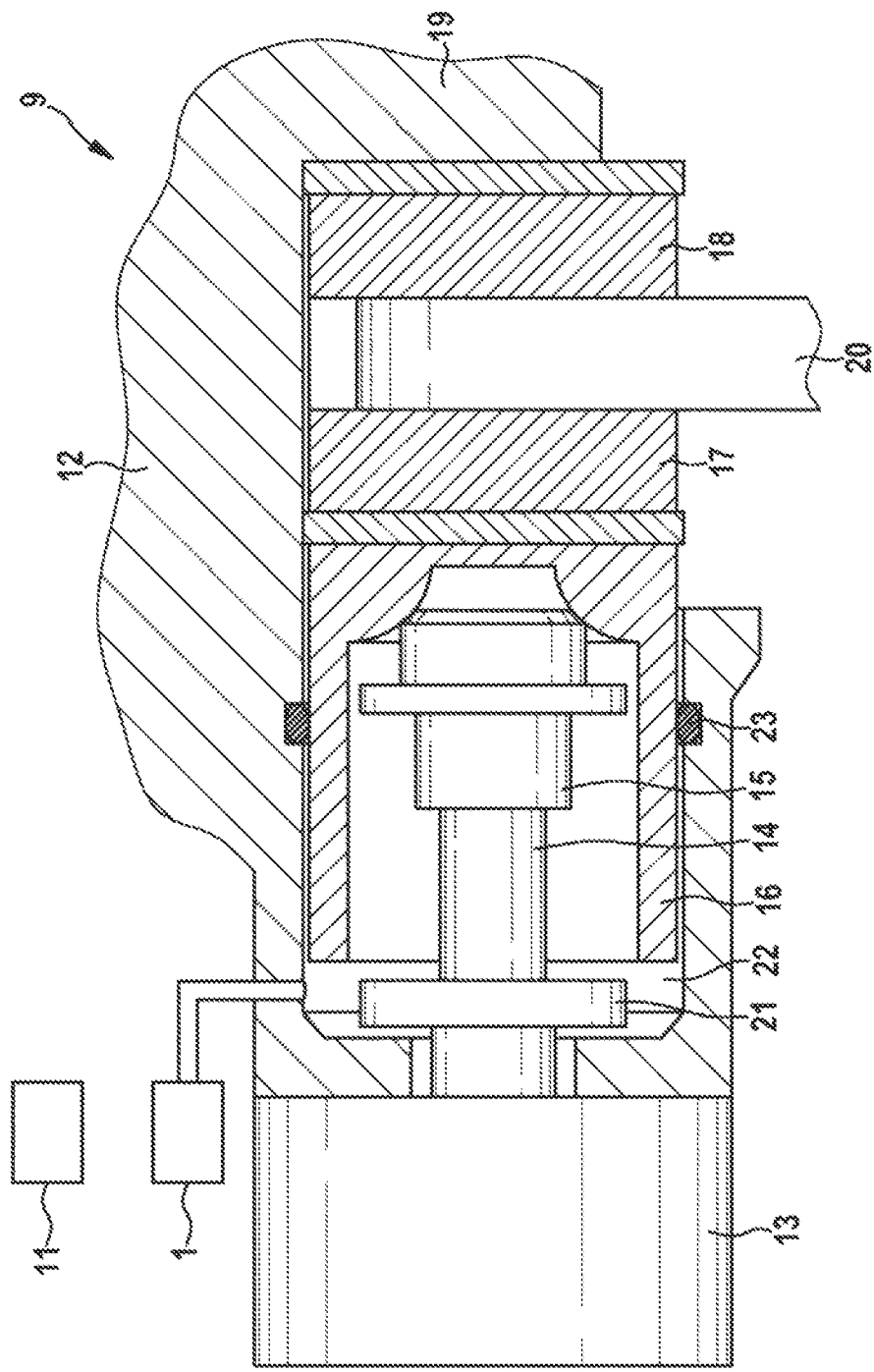
FIG. 2 is a cross-section through an electromechanical brake device with an electric brake motor.

In FIG. 2, the wheel brake device 9 which is arranged on a wheel on the rear axle of the vehicle is illustrated in detail. The wheel brake device 9 is part of the hydraulic vehicle brake 1 and is supplied with brake fluid 22 from the rear axle brake circuit. The wheel brake device 9 further has an electromechanical brake device which is preferably used as a parking brake for securing a vehicle in the stationary state but which can also be used during a movement of the vehicle, in particular at lower vehicle speeds below a speed limit value, to brake the vehicle.

The electromechanical brake device comprises a brake caliper unit 12 with a caliper 19 which engages over a brake disk 20. Acting as an actuation member, the brake device has a direct-current electric motor as a brake motor 13, whose rotor shaft rotatably drives a spindle 14 on which a spindle nut 15 is supported in a rotationally secure manner. In the event of a rotation of the spindle 14, the spindle nut 15 is axially displaced. The spindle nut 15 moves within a brake piston 16 which is the carrier of a brake lining 17 which is pressed by the brake piston 16 against the brake disk 20. At the opposite side of the brake disk 20 is another brake lining 18 which is retained in a fixed manner on the caliper 19. The brake piston 16 is sealed at the outer side thereof by means of an engaging sealing ring 23 in a pressure-tight manner with respect to the receiving housing.

Within the brake piston 16, the spindle nut 15, in the event of a rotational movement of the spindle 14, can move axially forward in the direction toward the brake disk 20 or, in the event of an opposing rotational movement of the spindle 14, can move axially toward the rear until a stop 21 is reached. In order to produce a clamping force, the spindle nut 15 acts on the inner end side of the brake piston 16, whereby the brake piston 16 which is supported in an axially displaceable manner in the brake device is pressed with the brake lining 17 against the facing end face of the brake disk 20.

For the hydraulic brake force, the hydraulic pressure of the brake fluid 22 from the hydraulic vehicle brake 1 acts on the brake piston 16. The hydraulic pressure may also be active in a supportive manner in the stationary state of the vehicle when the electromechanical brake device is actuated so that the entire brake force from the electromotively actuated portion and the hydraulic portion is combined. During travel of the vehicle, either only the hydraulic vehicle brake is active or both the hydraulic vehicle brake and the electromechanical brake device or only the electromechanical brake device in order to produce brake force. The actuation signals for controlling both the adjustable components of the hydraulic vehicle brake 1 and the electromechanical wheel brake device 9 are general produced in the regulation or control device 11.

In FIG. 3, a flow chart with method steps for providing a brake force in a vehicle is illustrated. The method may be carried out automatically both with a stationary vehicle in order to produce a parking brake force and with a travelling vehicle, for example, during a parking operation.

Initially in a first method step 30 after the start of the method, the electric brake motor of the electromechanical brake device is actuated and the rotor shaft of the brake motor is displaced in idle mode until the spindle nut comes into contact with the brake piston. The path which the spindle nut travels from the starting position thereof to the contact location in the brake piston constitutes the idle travel which is travelled without a build-up of brake force. The electric brake motor is stopped at the contact location.

Subsequently, in the following method step 31 the hydraulic vehicle brake is actuated independently and, using a hydraulic actuator, for example, the EPS pump of an iBooster, a hydraulic brake pressure is produced. The level of the brake pressure is produced from the current application and is adjusted to a desired pressure.

In the next method step 32, following the increase of the hydraulic brake pressure, the electric brake motor is actuated again in order to travel an additional idle travel which has been produced by the brake piston displacement as a result of the hydraulic brake pressure production. The additional idle travel is travelled by actuating the electric brake motor in idle mode until the contact location is again reached between the spindle nut and brake piston.

As soon as the additional idle travel has been travelled and the second contact location has been reached, in the following method step 33, the hydraulic pressure actually present in the wheel brake device is established. This is carried out on the basis of the additional idle travel travelled from the method step which represents the piston path which the brake piston has travelled as a result of the production of the hydraulic brake pressure. The additional idle travel correlates to the current hydraulic brake pressure.

In the method step 34, an interrogation is carried out as to whether the actual brake pressure which was established in step 33 corresponds to the desired hydraulic pressure. If this is not the case, the method is continued by following the "No" branch ("N") to step 35, in which a warning signal is produced, and is subsequently continued to step 36. In contrast, if the actual hydraulic brake pressure and the desired pressure correspond, the method is continued by following the "Yes" branch ("Y") to the next method step 36.

In step 36, the interrogation is carried out as to whether the additional idle travel travelled corresponds in two different wheel brake devices of the brake system. In this instance, it is verified in particular whether the additional idle travel on the wheel brake devices on the left and right of the same vehicle axle corresponds. If this is not the case, the method jumps by following the No branch to step 37 and there is produced a warning signal which indicates an error in the brake system. Subsequently, the next method step 38 is carried out.

However, if the interrogation in step 36 shows that the additional occurrences of idle travel on the at least two different wheel brake devices correspond, a correct function can be assumed and the method jumps by following the Yes branch directly to step 38.

In step 38, a brake force is built up in an electromechanical manner by actuating the electric brake motor. The level of the electromechanical brake force may, for example, be estimated with reference to the current path of the electric brake motor.

In the next step 39, the hydraulic pressure drop which has been produced by the mechanical displacement of the brake piston via the actuation of the brake motor is compensated for. The compensation for the hydraulic pressure drop is preferably carried out by actuating a hydraulic actuator, in particular the same hydraulic actuator as for the production of the hydraulic brake force in step 33 and during the build-up of the electromechanical brake force.

After a desired electromechanical brake force has been reached, the electric brake motor is switched off, wherein as a result of a self-locking action the position which the brake piston has reached is maintained.

The invention claimed is:

1. A method for providing a brake force in a vehicle that has a hydraulic vehicle brake and an electromechanical brake device having an electric brake motor, which displaces a brake piston against a brake disk, the method comprising:
   actuating the electric brake motor to pass an idle travel of the electric brake motor without build-up of electromechanical brake force;
   generating a hydraulic brake force after the actuation of the electric brake motor to pass the idle travel and before build-up of electromechanical brake force; and
   actuating the electric brake motor again in order to pass a displacement of the brake piston brought about as a result of hydraulic brake pressure generated during the generation of the hydraulic brake force and to build up electromechanical brake force.

2. The method as claimed in claim 1, wherein the displacement of the brake piston brought about by the hydraulic brake pressure is determined and, from the displacement of the brake piston, conclusions are drawn relating to an actual hydraulic brake pressure.

3. The method as claimed in claim 2, wherein, in the event of a deviation of the actual hydraulic brake pressure from a desired brake pressure, a warning signal is produced.

4. The method as claimed in claim 1, wherein the idle travel is determined on two wheel brake devices and, in the event of a deviation, a warning signal is produced.

5. The method as claimed in claim 1, wherein a hydraulic pressure drop, brought about by the build-up of electromechanical brake force, is compensated for by actuating a hydraulic actuator.

6. The method as claimed in claim 1, wherein a hydraulic pressure drop, brought about by the build-up of electromechanical brake force, is taken into account from the outset by an increased hydraulic brake pressure.

7. The method as claimed in claim 1, wherein the method is configured to produce a parking brake force when the vehicle is stationary.

8. The method as claimed in claim 1, wherein the method is configured to produce a brake force when the vehicle is moving.

9. A regulation or control device configured to carry out a method for providing a brake force in a vehicle that has a hydraulic vehicle brake and an electromechanical brake device having an electric brake motor, which displaces a brake piston against a brake disk, the method including:
   actuating the electric brake motor to pass an idle travel of the electric brake motor without build-up of electromechanical brake force;
   generating a hydraulic brake force after the actuation of the electric brake motor to pass the idle travel and before build-up of electromechanical brake force; and
   actuating the electric brake motor again in order to pass a displacement of the brake piston brought about as a result of hydraulic brake pressure generated during the generation of the hydraulic brake force and to build up electromechanical brake force.

10. A parking brake in a vehicle, comprising:
an electromechanical brake device having an electric brake motor that displaces a brake piston in a direction toward a brake disk, and
a regulation or control device configured to:
   actuate the electric brake motor to pass an idle travel of the electric brake motor without build-up of electromechanical brake force;
   generate a hydraulic brake force after the actuation of the electric brake motor to pass the idle travel and before build-up of electromechanical brake force; and
   actuate the electric brake motor again in order to pass a displacement of the brake piston brought about as a result of hydraulic brake pressure generated during the generation of the hydraulic brake force and to build up electromechanical brake force.

11. The method as claimed in claim 8, wherein the brake force is produced when the vehicle is moving below a speed limit value.

* * * * *

UNITED STATES PATENT AND TRADEMARK OFFICE
CERTIFICATE OF CORRECTION

PATENT NO. : 10,780,869 B2
APPLICATION NO. : 16/081827
DATED : September 22, 2020
INVENTOR(S) : Frank Baehrle-Miller et al.

Page 1 of 1

It is certified that error appears in the above-identified patent and that said Letters Patent is hereby corrected as shown below:

On the Title Page

The following section should be added:
-- (30) Foreign Application Priority Data
Mar. 31, 2016 (DE) ............... 10 2016 205 298 --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*